(12) United States Patent
Miyamoto et al.

(10) Patent No.: US 9,743,649 B2
(45) Date of Patent: Aug. 29, 2017

(54) FISHING SPINNING REEL

(71) Applicant: Globeride, Inc., Tokyo (JP)

(72) Inventors: Issei Miyamoto, Tokyo (JP); Kazuyuki Matsuda, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 29 days.

(21) Appl. No.: 14/632,707

(22) Filed: Feb. 26, 2015

(65) Prior Publication Data

US 2015/0264906 A1 Sep. 24, 2015

(30) Foreign Application Priority Data

Mar. 19, 2014 (JP) .................................. 2014-056719
Jul. 30, 2014 (JP) .................................. 2014-155378

(51) Int. Cl.
*A01K 89/01* (2006.01)
*A01K 89/00* (2006.01)

(52) U.S. Cl.
CPC ............ *A01K 89/01* (2013.01); *A01K 89/006* (2013.01); *A01K 89/01143* (2015.05); *A01K 89/011223* (2015.05)

(58) Field of Classification Search
CPC ............ A01K 89/01; A01K 89/011223; A01K 89/0114
See application file for complete search history.

(56) References Cited

U.S. PATENT DOCUMENTS

| 5,934,589 | A | 8/1999 | Young |
| 7,314,192 | B2 | 1/2008 | Kitajima et al. |
| 2004/0075004 | A1* | 4/2004 | Miyasaka ............... A01K 89/01 242/223 |
| 2006/0266861 | A1* | 11/2006 | Kitajima ............... A01K 89/01 242/322 |

FOREIGN PATENT DOCUMENTS

| JP | 06-011469 U | 2/1994 |
| JP | 07147871 A | 6/1995 |

(Continued)

OTHER PUBLICATIONS

Extended European Search Report dated Aug. 28, 2015 for European Patent Appln. No. 15156176.8.

(Continued)

*Primary Examiner* — Emmanuel M Marcelo
(74) *Attorney, Agent, or Firm* — Pillsbury Winthrop Shaw Pittman LLP

(57) ABSTRACT

One object is to provide a fishing spinning reel which ensures the concentricity of the spool shaft with respect to the pinion gear and enables the spool shaft to be smoothly and accurately reciprocated back and forth without rattling during rotational operation of the handle. The fishing spinning reel includes a support member supporting the front end of the spool shaft and having a concentric fitting portion for achieving concentricity with respect to the pinion gear. The spool shaft is supported at two points, one at the support member positioned in front of a front end of the pinion gear, and the other is a slide member of an oscillation device, whereby an outer circumferential surface of the spool shaft does not contact the inner circumferential surface of the pinion gear and the gap is maintained.

9 Claims, 12 Drawing Sheets

(56) References Cited

FOREIGN PATENT DOCUMENTS

| | | |
|---|---|---|
| JP | 2001190193 A | 7/2001 |
| JP | 2001-258438 | 9/2001 |
| JP | 2003-284465 | 10/2003 |
| JP | 2005218329 A | 8/2005 |
| JP | 2006-333705 | 12/2006 |
| JP | 2007116971 A | 5/2007 |
| JP | 2009112287 A | 5/2009 |

OTHER PUBLICATIONS

Chinese Office Action dated Dec. 23, 2016 for Application No. 201510121460.4.
Office Action dated Mar. 9, 2017 in Japanese Application 2014-056719.
Office Action dated Apr. 20, 2017 in Japanese Application 2014-155378 and English translation thereof.
Office Action Chinese Patent Application No. 201510121460.4 dated Jul. 4, 2017 with English translation.

\* cited by examiner

FISHING SPINNING REEL

CROSS-REFERENCE TO RELATED APPLICATIONS

This application is based on and claims the benefit of priority from Japanese Patent Application Ser. Nos. 2014-056719 (filed on Mar. 19, 2014) and 2014-155378 (filed on Jul. 30, 2014), the contents of which are hereby incorporated by reference in their entirety.

TECHNICAL FIELD

The present invention relates to a fishing spinning reel and, particularly to a fishing spinning reel characterized in support structure of a pinion gear rotationally driven by a drive gear and a spool shaft inserted through the pinion gear and supporting a spool around which a fishing line is wound so as to be able to reciprocate back and forth.

BACKGROUND

Conventionally, a fishing spinning reel includes a rotor rotationally driven by rotational handle operation and a spool reciprocated back and forth and around which a fishing line is wound. As generally known, the rotor meshes with a drive gear mounted on a handle shaft and is fixed with a rotor nut on the front end of a pinion gear supported so as to be rotatable in a direction orthogonal to the handle shaft, such that the rotor is rotationally driven. The spool shaft supporting the spool is inserted through the pinion gear and reciprocated back and forth by an oscillation device (reciprocation device) driven by the drive gear.

Accordingly, upon rotational operation of the handle, the spool shaft, which is inserted through the pinion gear, is reciprocated in the pinion gear rotationally driven. When a large load is imparted on the spool to bend the spool shaft, a larger contact pressure between the inner surface of the pinion gear and the spool shaft is produced to increase a sliding resistance on the spool shaft and degrade the smoothness of the rotational operation of the handle.

To overcome this problem, Japanese Utility Model Application Publication No. Hei 6-11469 (the "'469 Publication") for example discloses that rolling members are interposed between the inner circumferential surface of the pinion gear and the outer circumferential surface of the spool shaft to support the spool shaft on the inner circumferential surface of the pinion gear via rolling guide.

It is disclosed in Japanese Patent Application Publication No. 2001-258438 (the "'438 Publication") that a recess is formed along the axial direction in the inner surface of the pinion gear to form a gap between the inner surface of the pinion gear and the outer surface of the spool shaft, thereby reducing the sliding resistance on the spool shaft.

The '438 Publication also discloses that a rotor nut is screwed on the front portion of the pinion gear, the spool shaft is supported at its front end by a bearing provided between the rotor nut and the spool shaft, and the spool shaft is also supported at its rear end by a bearing provided on the rear portion of the pinion gear, thereby to separate the inner circumferential surface of the pinion gear from the outer circumferential surface of the spool shaft.

However, the support structure of the spool shaft disclosed in the '469 Publication, which employs rolling guide by the rolling members interposed between the inner circumferential surface of the pinion gear and the outer circumferential surface of the spool shaft, requires hardness and durability of the pinion gear and the spool shaft and thus limits the applicable materials and the degree of freedom of design. Such a support structure also requires space for rolling guide reciprocating back and forth and thus limits the size and shape.

In both the '438 Publication and Japanese Patent Application Publication No. 2006-333705 (the "'705 Publication"), the distance between the two support points at which the spool shaft is supported is small (in the '438 Publication, the two support points are within the axial length of the pinion gear; and in the 705 Publication, the two support points are near the opposite end surfaces of the pinion gear). Thus, due to the small gap between the inner circumferential surface of the pinion gear and the outer circumferential surface of the spool shaft, the spool shaft is prone to rattle in radial directions.

If a bearing is disposed between the rotor nut screwed on the pinion gear and the spool shaft, it is difficult to achieve the concentricity of the rotor nut with respect to the pinion gear (accordingly, it is difficult to achieve the concentricity of the spool shaft with respect to the pinion gear). Therefore, when the pinion gear is rotated, the spool shaft may be rotated eccentrically. Further, since a slide member of an oscillation device is positioned in accordance with positioning of the spool shaft, the spool shaft (spool) may not be reciprocated back and forth accurately if the spool rattles or rotates eccentrically.

SUMMARY

The present invention addresses the above problem, and one object thereof is to provide a fishing spinning reel wherein the concentricity of the spool shaft with respect to the pinion gear is ensured, the spool shaft can smoothly reciprocate back and forth without rattling during rotational operation of the handle, and the sliding resistance on the spool shaft is reduced, without limiting the degree of freedom of design.

To the above end, the present invention provides a fishing spinning reel comprising: a reel body; a handle adapted to be rotatably supported on the reel body; a drive gear adapted to be rotationally driven by rotational operation of the handle; a pinion gear adapted to mesh with the drive gear; a rotor adapted to be fixed on a distal end of the pinion gear; a spool shaft adapted to be inserted through the pinion gear so as to maintain a gap between the spool shaft and an inner circumferential surface of the pinion gear; a spool mounted on a front end of the spool shaft, wherein the spool is adapted to hold a fishing line wound therearound; an oscillation device adapted to support a rear end of the spool shaft, wherein the oscillation device is adapted to reciprocate the spool shaft back and forth in accordance with drive of the drive gear, and a support member adapted to support the front end of the spool shaft and having a concentric fitting portion for achieving concentricity with respect to the pinion gear, wherein the spool shaft is supported at two points, one at the support member positioned in front of a font end of the pinion gear, and the other at a slide member of the oscillation device, whereby an outer circumferential surface of the spool shaft does not contact the inner circumferential surface of the pinion gear and the gap is maintained.

In the above fishing spinning reel, the spool shaft is supported at two points in the front and rear ends so as to be able to reciprocate back and forth such that the outer circumferential surface thereof may not contact the inner circumferential surface of the pinion gear; therefore, the resistance produced when the spool shaft is reciprocated back and forth is small, and the rotational operation of the handle is light. Further, when the spool shaft is bent due to a large load on the spool, the gap between the spool shaft and the pinion gear prevents the spool shaft from contacting the pinion gear. Likewise, when for example the pinion gear is bent under a load produced by meshing between the drive gear and the pinion gear during the rotational operation of the handle, the pinion gear is prevented from contacting the spool shaft, and thus no sliding resistance is produced.

Additionally, in the above fishing spinning reel, the spool shaft is supported at its front end in front of the front end of the pinion gear by a support member, and the spool shaft is also supported at its rear end by a slide member of the oscillation device; therefore, the distance between the two support points is longer than the conventional configuration, and the spool shaft is less prone to rattle in the radial directions.

Further, in the above fishing spinning reel, the spool shaft is supported at its front end by a support member having a concentric fitting portion for achieving concentricity with respect to the pinion gear, which ensures the concentricity of the spool shaft with respect to the pinion gear. Accordingly, the pinion gear can be rotated stably, and thus the spool shaft inserted through the pinion gear can be slid back and forth stably and accurately.

In the above arrangement, the concentric fitting portion of the support member may be either fitted around a mating member on its inner circumferential surface or fitted in a mating member on its outer circumferential surface. Additionally, the concentric fitting portion of the support member may have a desirably shaped fitting section as long as it is concentric with respect to the pinion gear. That is, the fitting between the concentric fitting portion of the support member and a fitting portion of the mating member may be achieved by either fitting between (perfectly) circular sections or fitting between substantially circular sections at least partially including a circular arc or other sections. The concentric fitting portion of the support member should preferably be fitted directly on the pinion gear, but may be fitted on a member other than the pinion gear as long as the concentricity with respect to the pinion gear is achieved.

The present invention provides a fishing spinning reel which ensures the concentricity of the spool shaft with respect to the pinion gear and enables the spool shaft to be smoothly and accurately reciprocated back and forth without rattling during rotational operation of the handle.

BRIEF DESCRIPTION OF THE DRAWINGS

FIG. 2b is a sectional view along the A-A line in FIG. 2a.

FIG. 3b is a sectional view along the B-B line in FIG. 3a; and FIG. 3c is a sectional view along the C-C line in FIG. 3a.

FIG. 4a is an enlarged view of a main part of the fishing spinning reel according to the third embodiment of the present invention; and FIG. 4b is a sectional view along the D-D line in FIG. 4a.

FIG. 5b is a sectional view along the A-A line in FIG. 5a.

FIG. 6 is an enlarged sectional view of P portion in FIG 5a.

FIG. 7b is a sectional view along the B-B line in FIG. 7a.

FIG. 8 is an enlarged sectional view of Q portion in FIG. 7a.

FIG. 9b is a sectional view along the C-C line in FIG. 9a.

FIG. 10 is an enlarged sectional view of R portion in FIG. 9a.

DESCRIPTION OF EXAMPLE EMBODIMENTS

Embodiments of a fishing reel according to the present invention will be hereinafter described with reference to the drawings.

Figure 1:
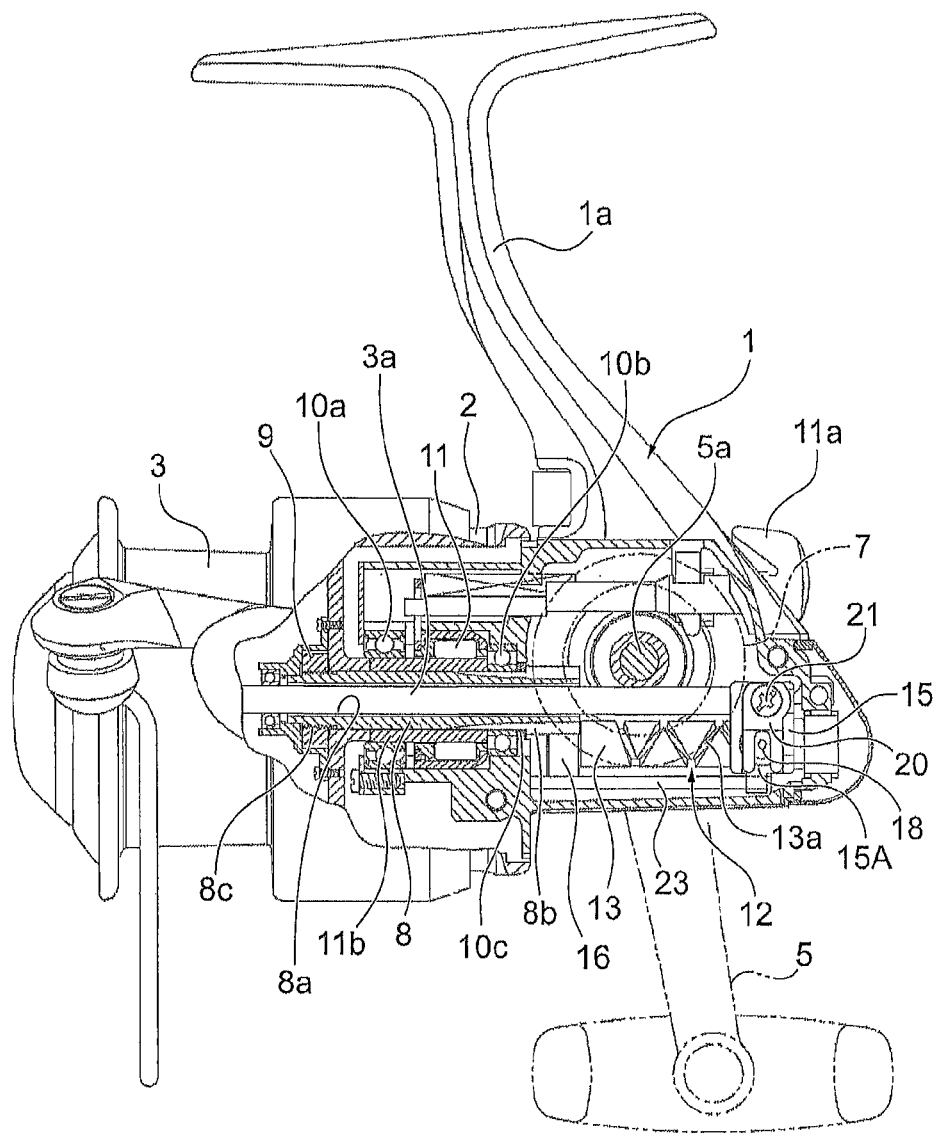
FIG. 1 is a side view of the fishing spinning reel according to the first embodiment of the present invention, partially showing a section thereof.

FIGS. 1 and 2 show the first embodiment of the present invention. As shown in FIG. 1, the reel body 1 of the fishing spinning reel according to the embodiment may be integrated with a reel leg 1a to be mounted on a fishing rod; and the reel body 1 may include, in front of the reel leg 1a, a rotor 2 rotatably supported and a spool 3 supported so as to be able to move back and forth in synchronization with the rotation of the rotor 2.

In the reel body 1, a handle shaft 5a may be rotatably supported and may have a handle 5 mounted on a projecting end thereof. The handle shaft 5a may be engaged with a winding driving mechanism, which may be mounted on the handle shaft 5a and include a drive gear 7 having internal teeth, and a pinion gear 8 meshing with the drive gear 7, extending in the direction orthogonal to the handle shaft 5a, and having therein a hollow portion 8a extending axially. The pinion gear 8 may have a tooth portion 8b formed in the rear end thereof; and the tooth portion 8b may mesh with the drive gear 7.

In the front of the pinion gear 8, a male screw 8c is formed, and the front end of the pinion gear 8 may be fitted into a central hole of the rotor 2, where a rotor nut 9 may be screwed on the male screw 8c. Thus, the rotor 2 may be fixed on the pinion gear 8. The rotor 2 may be unrotatably fitted around the (non-circular) outer circumferential surface of the pinion gear 8 at the fitting portion 2b having a non-circular section.

The pinion gear 8 of this embodiment may be rotatably supported by the reel body 1 at two points in front of (on the spool side with respect to) the meshing region between the tooth portion 8b and the drive gear via the bearings 10a, 10b; and the pinion gear 8 may have a hollow portion 8a into which the spool shaft 3a extending in the direction orthogonal to the handle shaft 5a may be inserted so as to be movable in the axial direction. The spool 3 may be mounted on the front end of the spool shaft 3a. In this case, on the outer circumference of the middle region of the pinion gear 8 may be provided a publicly known one-way clutch 11. The rotation status of the pinion gear (rotor) may be switched by switching the switching lever 11a rotatably supported on the back of the reel body 1 (switching between bidirectional rotation and single-direction rotation for winding the line). The bearing 10a on the front side may be interposed between the reel body 1 and the inner race 11b of the one-way clutch 11 unrotatably fixed on the pinion gear 8; and the bearing 10b on the rear side may be installed near the meshing region between the tooth portion 8b of the pinion gear 8 and the drive gear 7 via a washer 10c.

The pinion gear 8 may be engaged with a reciprocation device (oscillation device) 12 for reciprocating the spool 3 (spool shaft 3a) back and forth. The reciprocation device 12 of this embodiment may include a worm shaft 13 rotatably supported within the reel body 1 and extending in parallel with the spool shaft 3a and a slide member (oscillating slider) 15 fixed on the rear end of the spool shaft 3a. On the front end of the worm shaft 13 may be provided an oscillation gear 16 meshing with the pinion gear 8. When the handle 5 is rotated, the worm shaft 13 may be rotationally driven via the drive gear 7, pinion gear 8, and the oscillation gear 16.

The worm shaft 13 may have a spiral cam groove 13a formed in the outer circumferential surface thereof along the axial direction; and the cam groove 13a may be engaged with the engagement lug (not shown) of the engagement pin 18 housed in the slide member 15 described later.

The slide member 15 may include a body 15A having a cylindrical housing hole; and the body 15A may be mounted on the rear end of the spool shaft 3a to support the rear end of the spool shaft 3a. In the rear end of the spool shaft 3a, there is formed a planar surface having a noncircular section and extending orthogonally to the axis of the handle shaft. A retaining member (plate) 20 may be applied onto the planar surface, and a setscrew 21 may be screwed into the planar surface 3b from the direction of the handle shaft. The spool shaft 3a may be unrotatably secured to the slide member body 15.

An engagement pin 18 having a cylindrical shape may be housed and supported in the cylindrical housing hole of the body 15A of the slide member 15. In one end (front end) of the engagement pin 18, the engagement lug engaged with the cam groove 13a in the worm shaft 13 may be formed. The other end of the engagement pin may abut the retaining member 20 and retained thereby. The slide member 15 (the body 15A) may be unrotatably supported and guided by the guide 23 extending in parallel with the worm shaft 13 so as to be movable back and forth.

Figure 2A:
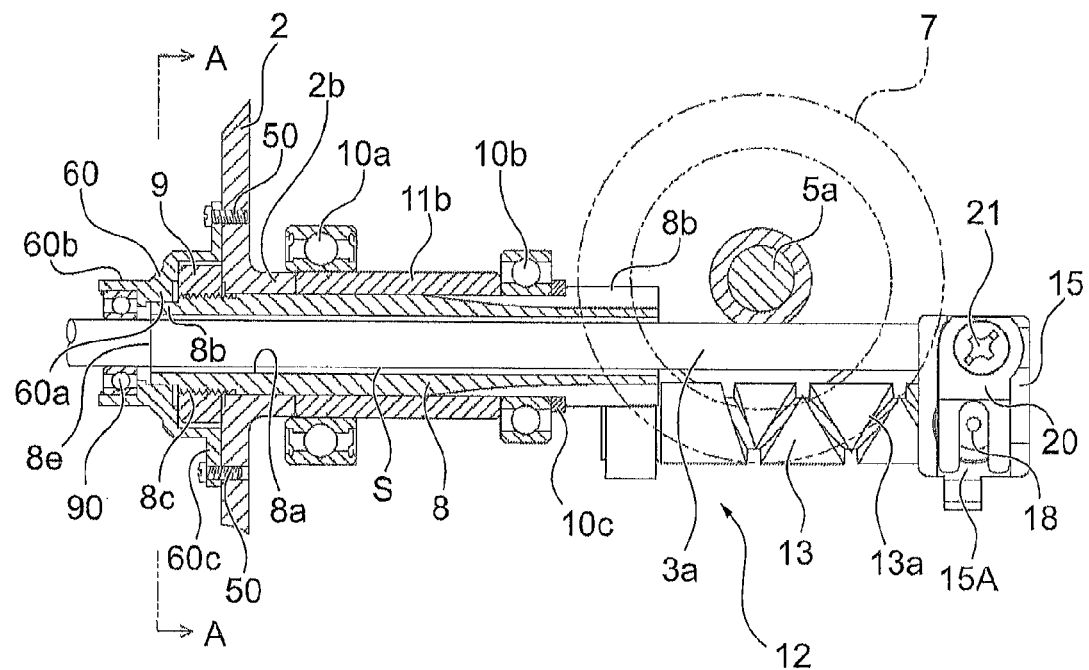
FIG. 2a is an enlarged view of a main part of FIG. 1.
Figure 2B:
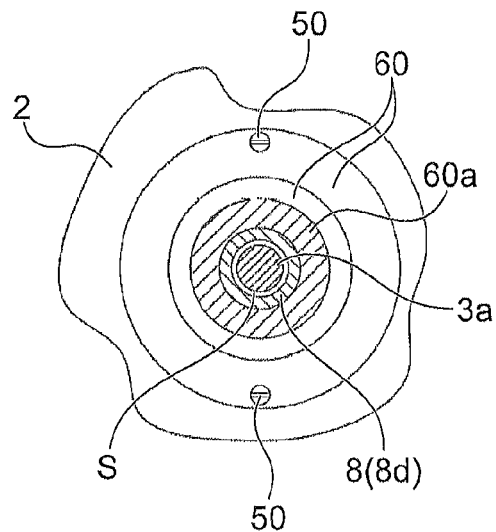

As clearly shown in FIGS. 2a and 2b, the spool shaft 3a may be inserted into the hollow portion 8a of the pinion gear 8 for the entire length thereof such that the outer circumferential surface thereof does not contact the inner circumferential surface of the pinion gear 8 (with a gap s maintained therebetween). The front end of the spool shaft 3a projecting beyond the front end 8e of the pinion gear 8 may be supported by the support member 60, and the rear end projecting beyond the rear end of the pinion gear 8 may be supported by the slide member 15 of the reciprocation device 12, as described above.

In the embodiment, the support member 60 may be formed into a stepped cylindrical shaped, wherein an outer circumferential flange end 60c may be fixed on the rotor 2 via a screw 50. The support member 60 may extend to the front of the pinion gear 8 so as to externally surround the rotor nut 9 and the pinion gear 8, and may be fitted on, e.g., the rotor nut 9 via a non-circular fitting portion so as to serve as a rotation locking member for the rotor nut 9.

Further, the support member 60 may include a concentric fitting portion 60a for achieving concentricity with respect to the pinion gear 8 and a support portion 60b supporting the distal end of the spool shaft 3a via a bearing 90. The concentric fitting portion 60a may have a circular section, and an inner circumferential surface thereof may be concentrically fitted around the outer circumferential surface of a distal end fitting portion 8d of the pinion gear 8, which also has a circular section. The support portion 60b, having a cylindrical shape, may extend beyond the front end 8e of the pinion gear 8 and support the distal end of the spool shaft 3a via the bearing 90 in front of the front end 8e of the pinion 8 so as to be movable back and forth. That is, the spool shaft 3a may be supported by the support member 60 concentric with the pinion gear 8 via the bearing 90, thereby ensuring the concentricity with respect to the pinion gear 8.

Thus, in the fishing spinning reel of the embodiment, the spool shaft 3a may be supported at two points in the front and rear ends so as to be able to reciprocate back and forth such that the outer circumferential surface thereof may not contact the inner circumferential surface of the pinion gear 8, with the gap s maintained therebetween; therefore, the resistance produced when the spool shaft 3a is reciprocated back and forth is small, and the rotational operation of the handle is light. Further, when the spool shaft 3a is bent due to a large load on the spool 3, the gap s between the spool shaft 3a and the pinion gear 8 prevents the spool shaft 3a from contacting the pinion gear 8. Likewise, when for example the pinion gear 8 is bent under a load produced by meshing between the drive gear 7 and the pinion gear 8 during the rotational operation of the handle, the pinion gear 8 is prevented from contacting the spool shaft 3a, and thus no sliding resistance is produced.

Additionally, in the fishing spinning reel of the embodiment, the spool shaft 3a is supported at its front end in front of the front end of the pinion gear 8 by a support member 60, and the spool shaft 3a is also supported at its rear end by a slide member 15 of the reciprocation device 12; therefore, the distance between the two support points is longer than the conventional configuration, and the spool shaft 3a is less prone to rattle in the radial directions.

Further, in the fishing spinning reel of the embodiment, the spool shaft 3a may, be supported at its front end by a support member 60 having a concentric fitting portion 60a for achieving concentricity with respect to the pinion gear 8, which ensures the concentricity of the spool shaft 3a with respect to the pinion gear 8 without being impacted by eccentricity of the rotor nut with respect to the pinion gear. Accordingly, the pinion gear 8 can be rotated stably, and thus the spool shaft 3a inserted through the pinion gear 8 can be slid back and forth stably and accurately.

Figure 3A:
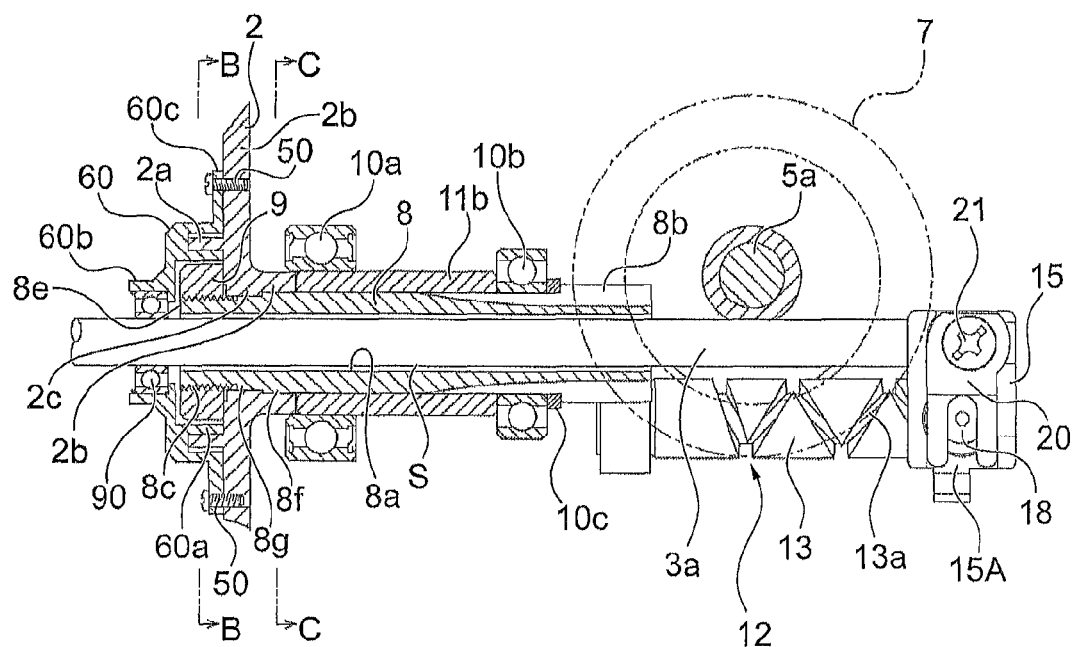
FIG. 3a is an enlarged view of a main part of the fishing spinning reel according to the second embodiment of the present invention.
Figure 3B:
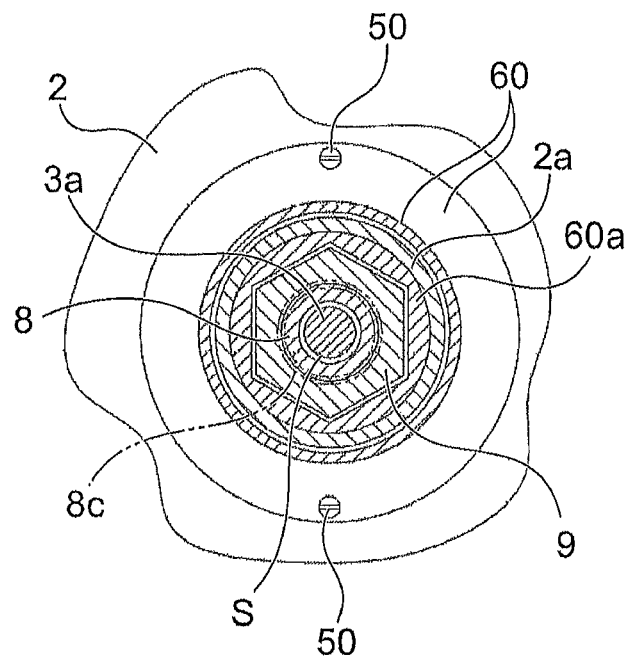
Figure 3C:
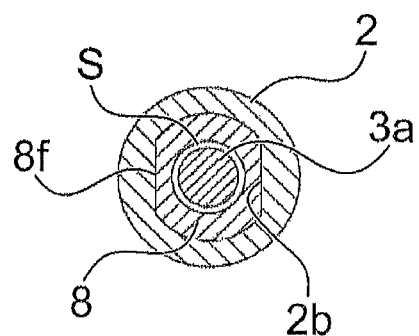

FIGS. 3a to 3c show the second embodiment of the present invention. In this embodiment, the support member 60 may not be directly fitted on the pinion gear 8 concentrically, unlike the first embodiment; but the support member 60 may be concentrically fitted on the rotor 2 which is concentrically fitted on the pinion gear 8.

More specifically, in this embodiment, the rotor 2 may be configured such that the fitting portion 2b thereof, having a non-circular section, may be unrotatably fitted around the outer circumferential surface of the pinion gear 8 (non-circular fitting portion 8f) (see the section shown in FIG. 3c), as in the first embodiment, and such that the circular inner circumferential surface of the concentric fitting portion 2c which is continuous from the fitting portion 2b forward may be concentrically fitted around the outer circumferential surface of the fitting portion 8g, having a circular section, in the front end of the pinion gear 8 (e.g., between the male screw 8c and the non-circular fitting portion 8f).

Further, a fitting portion 2a having a cylindrical shape and projecting forward may be provided on a radially extending portion 2b of the rotor 2 on which an outer circumferential flange end 60c of the support member 60 may be fixed via a screw 50. On the circular inner circumferential surface of the fitting portion 2a may be concentrically fitted an inner tube 60a, the inner tube 60a serving as a concentric fitting portion of the support member 60 which may be unrotatably fitted on the rotor nut 9. As shown particularly in FIG. 3b, the inner tube 60a as the concentric fitting portion may have a non-circular inner circumferential surface which may be unrotatably fitted on the rotor nut 9, and a circular outer circumferential surface which may be concentrically fitted on the circular inner circumferential surface of the fitting portion 2a of the rotor 2. As in the first embodiment, the support portion 60b of the support member 60 may have a cylindrical shape and extend beyond the front end 8e of the pinion gear 8, and may support the distal end of the spool shaft 3a via the bearing 90 in front of the front end 8e of the pinion 8 so as to be movable back and forth. That is, in this embodiment, the concentricity of the spool shaft 3a with respect to the pinion gear 8 may be ensured via the rotor 2 concentric with the pinion gear 8 and the support member 60 concentric with the rotor 2. In other respects, this embodiment may be configured in the same way as the first embodiment. Accordingly, this embodiment may produce the same effect as the first embodiment.

Figures 4A, 4B:
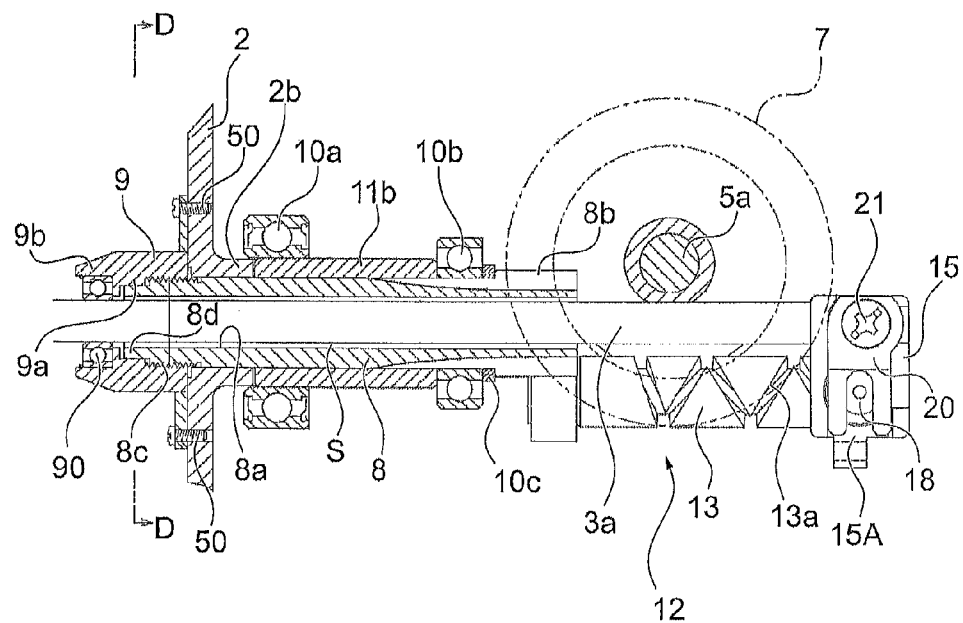

FIGS. 4a and 4b show the third embodiment of the present invention. In this embodiment, the rotor nut 9 may also serve as the support member 60 in the first and second embodiments. More specifically, the support member 9 may include a concentric fitting portion 9a for achieving concentricity with respect to the pinion gear 8 and a support portion 9b supporting the distal end of the spool shaft 3a via a bearing 90. The concentric fitting portion 9a may have a circular section, and the inner circumferential surface thereof may be concentrically fitted around the outer circumferential surface of the distal end fitting portion 8d of the pinion gear 8, which also has a circular section (since the concentricity of the rotor nut 9 may be ensured by the concentric fitting portion 9a, the male screw 8c may be screwed with a certain amount of looseness). The support portion 9b, having a cylindrical shape, may extend beyond the front end 8e of the pinion gear 8 and support the distal end of the spool shaft 3a via the bearing 90 in front of the front end 8e of the pinion 8 so as to be movable back and forth. That is, the spool shaft 3a may be supported by the rotor nut 9 concentric with the pinion gear 8 via the bearing 90, thereby ensuring the concentricity with respect to the pinion gear 8. In other respects, this embodiment may be configured in the same way as the first embodiment. Accordingly, this embodiment may produce the same effect as the first embodiment.

Figure 5A:
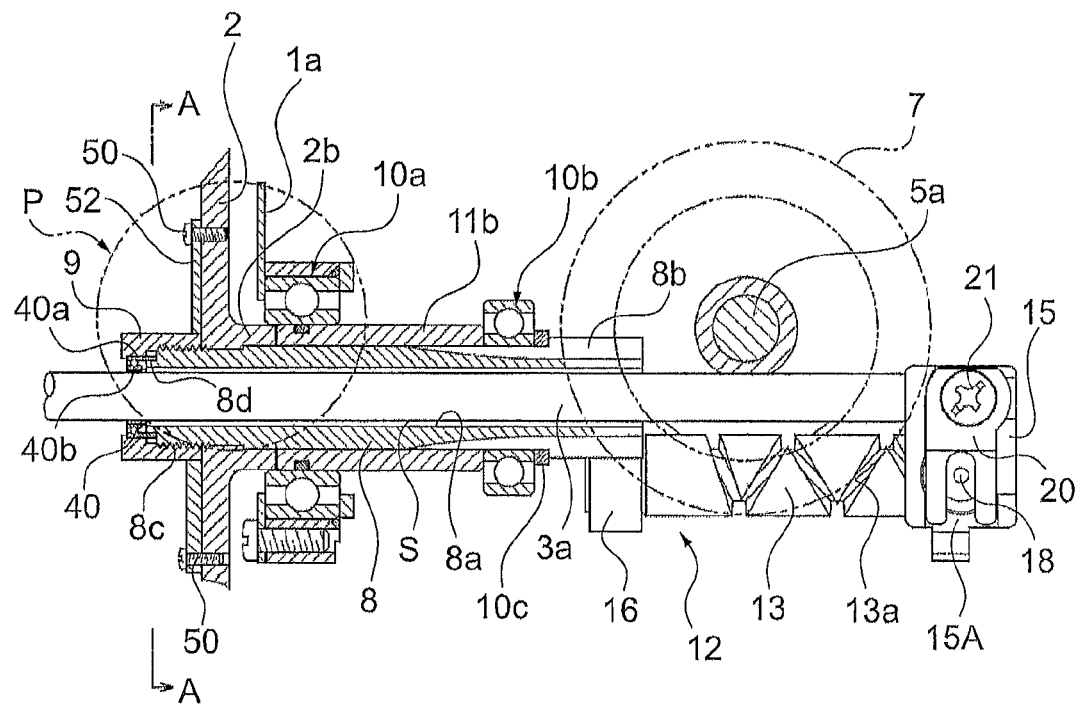
FIG. 5a is an enlarged view of a main part of the fishing spinning reel according to the fourth embodiment of the present invention.
Figure 5B:
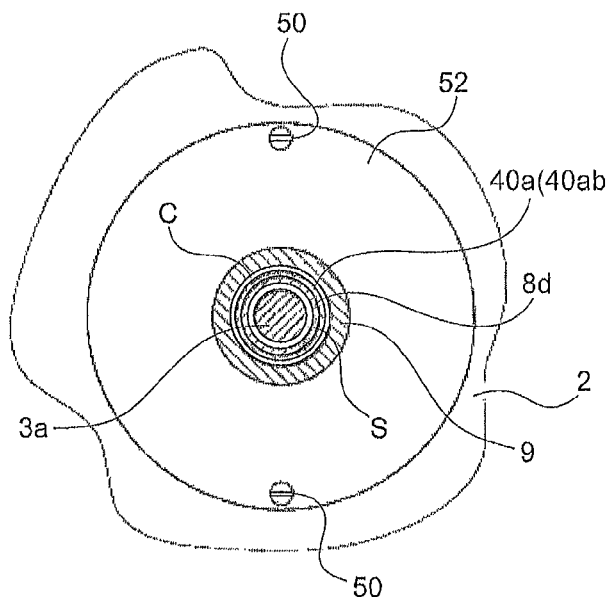
Figure 6:
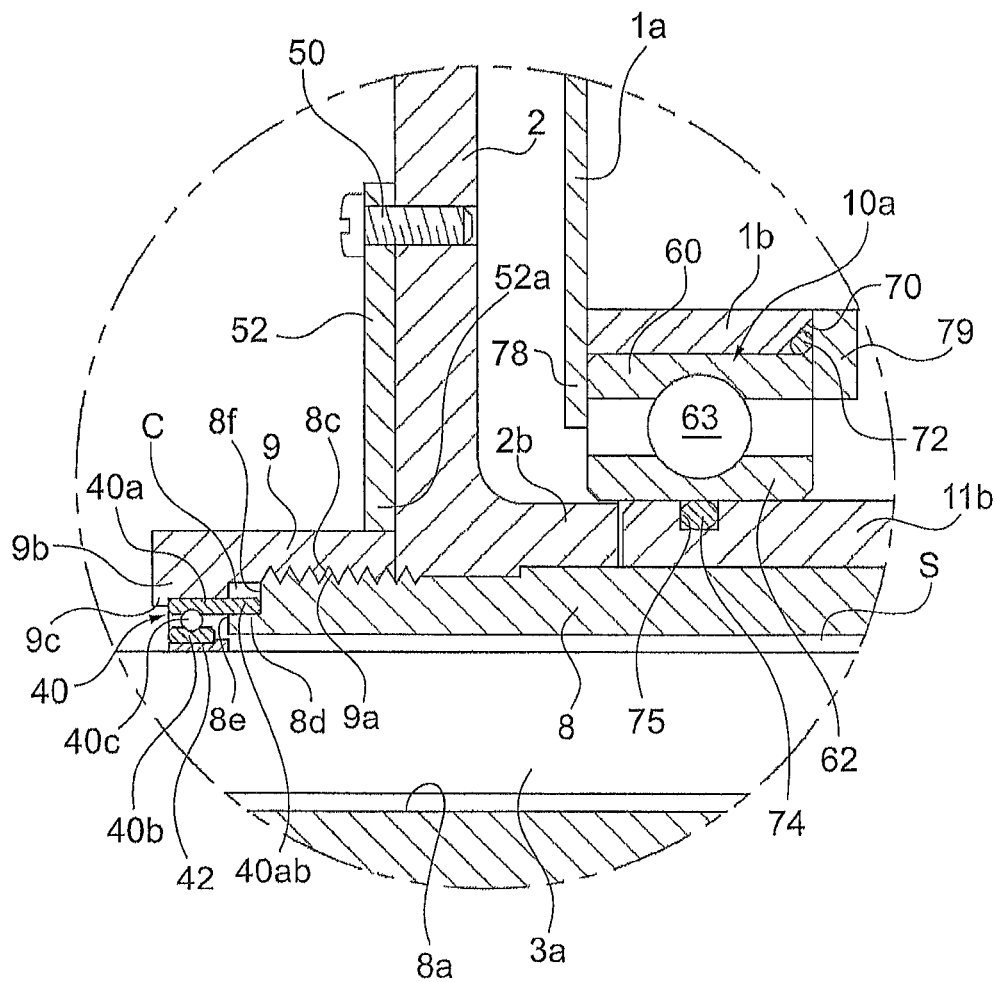

FIGS. 5a, 5b, and 6 show the fourth embodiment of the present invention. In this embodiment, a projecting end of the spool shaft 3a projecting from the front end 8e of the pinion gear 8 may be supported by a support member 40 interposed between the rotor nut 9 and the spool shaft 3a. More specifically, the support member 40 may be configured as a rolling bearing including an outer race 40a, an inner race 40b, and a plurality of rolling members 40c retained between the outer race 40a and the inner race 40b so as to be rollable. The support member 40 may be interposed between the inner circumferential surface of the tubularly shaped rotor nut 9 and the outer circumferential surface of the spool shaft 3a projecting from the front end 8e of the pinion gear 8 and may support the spool shaft 3a, so as to form a gap s between the pinion gear 8 and the spool shaft 3a and separate the inner circumferential surface of the pinion gear 8 from the outer circumferential surface of the spool shaft 3a.

In the embodiment, an annular collar member 42 formed of a synthetic resin or a metal may be interposed between the inner circumferential surface of the support member 40 (the inner circumferential surface of the inner race 40b of the rolling bearing 40) and the outer circumferential surface of the spool shaft 3a. The support member 40 may be interposed between the outer circumferential surface of the collar member 42 and the inner circumferential surface of an annular projection 9b of the rotor nut 9 which is annularly projecting radially inward toward the spool shaft 3a As described above, the collar member 42 may be formed of a metal or a resin material, so as to enhance slidability and the degree of freedom of design in employing the rolling bearing (ball bearing) having a standardized radial size and axial length as a support member for a reel constituent.

The support member 40 may include a concentric fitting portion 40ab fitted around the outer circumferential surface of the front end of the pinion gear 8 so as to achieve concentricity with respect to the pinion gear 8. More specifically, the concentric fitting portion 40ab may be formed of the outer race 40a of the rolling bearing 40 serving as a support member. That is, in the embodiment, the outer race 40a of the rolling bearing 40 may extend axially longer than the inner race 40b to form the annular concentric fitting portion 40ab, and a projecting fitting portion 8d may be projected axially forward from the front end of the male screw 8c of the pinion gear 8 beyond the step 8f, the projecting fitting portion 8d having a smaller diameter than the male screw 8c, so as to form a gap c between the inner circumferential surface of the rotor nut 9 and the projecting fitting portion 8d of the pinion gear 8. In the gap c, the concentric fitting portion 40ab can be fitted around the outer circumferential surface of the pinion gear 8 in front of the male screw 8c.

The concentric fitting portion 40ab may have a circular section, and an inner circumferential surface thereof may be concentrically fitted around the outer circumferential surface of the projecting fitting portion 8d of the pinion gear 8, which also has a circular section. The concentric fitting portion 40ab may contact the end surface of the step 8f. That is, the spool shaft 3a may be supported via the interposed support member (rolling bearing 40) concentric with the pinion gear 8, thereby ensuring the concentricity with respect to the pinion gear 8.

The fishing spinning reel of the embodiment further includes a retainer for axially preventing the support member 40 from coming off of the pinion gear 8. More specifically, in the embodiment, the retainer may be formed of the rotor nut 9. That is, in the present invention, the front end of the annular projection 9b of the rotor nut 9 may project radially inward to form a retaining contact portion 9c, which may abut the front end edge of the outer race 40a of the rolling bearing 40 serving as a support member fitted on the projecting fitting portion 8d of the pinion gear 8, thereby preventing the support member 40 from coming off of the pinion gear 8 in the axial direction. The retainer can be mounted stably by interposing an elastic material between the retaining contact portion 9c or the step 8f and the end surface of the outer race 40a.

The fishing spinning reel of the embodiment also includes a rotation locking member 52 for rotor nut 9. The rotation locking member 52 may be fitted around, e.g., the outer circumferential surface of the rotor nut 9 at its non-circular fitting portion so as to prevent rotation of the rotor nut 9 coupled to the pinion gear 8; and the rotation locking member 52 may be fixed on the rotor 2 via a screw 50.

In the embodiment, the bearing 10*a* on the front side for rotatably supporting the pinion gear 8 may include an inner race 62 rotatably fitted on the pinion shaft 8 side (or the inner race 11*b* side of the one-way clutch 11 in the embodiment), an outer race 60 fitted on the fitting portion 1*b* of the reel body 1, and multiple rolling members 63 disposed between the inner race 62 and the outer race 60. The bearing 10*a* may be embedded between walls 78, 79 of an inner frame 1*a* of the reel body 1. Further, an O-ring 72 may be disposed between the outer race 60 and the fitting portion 1*b* of the reel body 1; and an O-ring 74 may be disposed between the inner race 62 and the inner race 11*b* of the one-way clutch 11. The O-rings 72, 74 may be formed of elastic members (or soft members). The O-rings 72, 74 may be stably mounted in grooves formed in the adjacent members. In the embodiment, a circumferential groove 75 may be formed in the outer circumferential surface of the inner race 11*b* of the one-way clutch 11 so as to face a substantially axially middle portion of the inner race 62; and a tapered groove 70 may be formed in the fitting portion of the reel body 1 so as to face an axial end edge of the outer race 60. The O-rings 72, 74 may be attached into these grooves 70, 75.

The depths of the grooves 70, 75 may be slightly smaller than the diameter of the corresponding one of the O-rings 72, 74 attached thereinto, and the widths of openings of the grooves may be slightly larger than the diameter of the corresponding one of the O-rings 72, 74 attached thereinto. The O-rings 72, 74 attached into the grooves 70, 75 may slightly project from the grooves 70, 75 and can be deformed in the grooves 70, 75 along the axial direction.

Therefore, when the bearing 10*a* is fitted into the reel body 1 along the axial direction after the O-rings 72, 74 are attached into the grooves 70, 75, the O-rings 72, 74 can be deformed in the axial direction, which may ensure sealing between the outer race 60 and the fitting portion 1*b* of the reel body 1 and between the inner race 62 and the inner race 11*b* of the one-way clutch 11.

The inner race 11*b* of the one-way clutch 11 may be fitted in the inner race 62 of the bearing 10*a* with a slight looseness. The O-ring 74 interposed therebetween may absorb the looseness. Also, the outer race 60 of the bearing 10*a* may be fitted in the fitting portion 1*b* of the reel body 1 with a slight looseness. The O-ring 72 interposed therebetween may absorb the looseness. That is, sealing can be maintained for a long period in a simple configuration where the O-ring 74 may be disposed on the inner circumferential surface of the inner race 62 and the O-ring 72 may be disposed on the outer circumferential surface of the outer race 60.

The above structure of the bearing 10*a* is beneficial since preloads of the O-rings 72, 74 may cause the members to be centered with each other, resulting in stable and enhanced rotation feeling. Ordinary bearing incorporating structures include a clearance for incorporation on each of inner and outer surfaces of the bearing; therefore, the bearing incorporated may be biased by the weight of parts. Accordingly, when the reel is reset in a different orientation or the handle or the spool is replaced desirably with another one having a different weight, the bearing may be biased in a different direction to a different degree, resulting in different rotation feeling of the rotation members supported by the bearing. To avoid such a failure, the clearance for incorporation of the bearing may be eliminated by employing press-fitting incorporation, but this causes difficulty in disassembling and assembling. However, the above structure where the bearing 10*a* is interposed on the O-rings may eliminate the need of press-fitting incorporation and enables the members to be centered with each other so as to achieve stable and enhanced rotation feeling even if there are clearances described above. Additionally, the mounted O-rings (or soft members) 72, 74 may serve as dampers may inhibit the gear noise and the rolling noise of the rolling bearing, from being felt or heard.

In the above arrangement, it is also possible to provide only one O-ring on the inner race 62 or the outer race 60 of the bearing 10*a*. Such structure of the bearing 10*a* may be applied to other rolling bearings and other types of bearings.

As described above, in the fishing spinning reel of the embodiment, the spool shaft 3*a* may be supported by the support member 40 so as to be able to reciprocate back and forth such that the outer circumferential surface thereof may not contact the inner circumferential surface of the pinion gear 8, with the gap s maintained therebetween; therefore, the sliding resistance produced during the reciprocation is small, and the rotational operation of the handle 5 is light. Further, when the spool shaft 3*a* is bent due to a large load on the spool 3, the gap s produced between the spool shaft 3*a* and the pinion gear 8 by an interposed support member 40 may prevent the spool shaft 3*a* from contacting the pinion gear 8.

In the fishing spinning reel of the present invention, the support member 40 may be interposed between the inner circumferential surface of the rotor nut 9 screwed on the outer circumferential surface of the front end of the pinion gear 8 and the outer circumferential surface of the spool shaft 3*a* projecting beyond the front end 8*e* of the pinion gear 8, not between the inner circumferential surface of the pinion gear 8 and the outer circumferential surface of the spool shaft 3*a*. Therefore, the sliding resistance on the spool shaft 3*a* can be reduced while minimizing the increase in the inner and outer diameters of the pinion gear 8 (or the increase in the size and weight of the reel); and use of the interposed support member 40 having a sufficient size and strength may prevent reduction in strength (required load rating can be satisfied).

Further, in the fishing spinning reel of the embodiment, the support member 40 may include the concentric fitting portion 40*ab* fitted on the front end of the pinion gear 8 for achieving concentricity with respect to the pinion gear 8; therefore, the concentricity of the spool shaft 3*a* supported by the support member 40 with respect to the pinion gear 8 can be ensured. Accordingly, the pinion gear 8 can be rotated stably, and thus the spool shaft 3*a* inserted through the pinion gear 8 can be reciprocated back and forth stably and accurately without being subjected to unnecessary sliding resistance. Further, since the support member 40 may be directly fitted on the pinion gear 8 via the concentric fitting portion 40*ab* without using any other intermediate members, there is no possibility of lowering the centering accuracy due to accumulated dimension errors of the intermediate members.

Figure 7A:
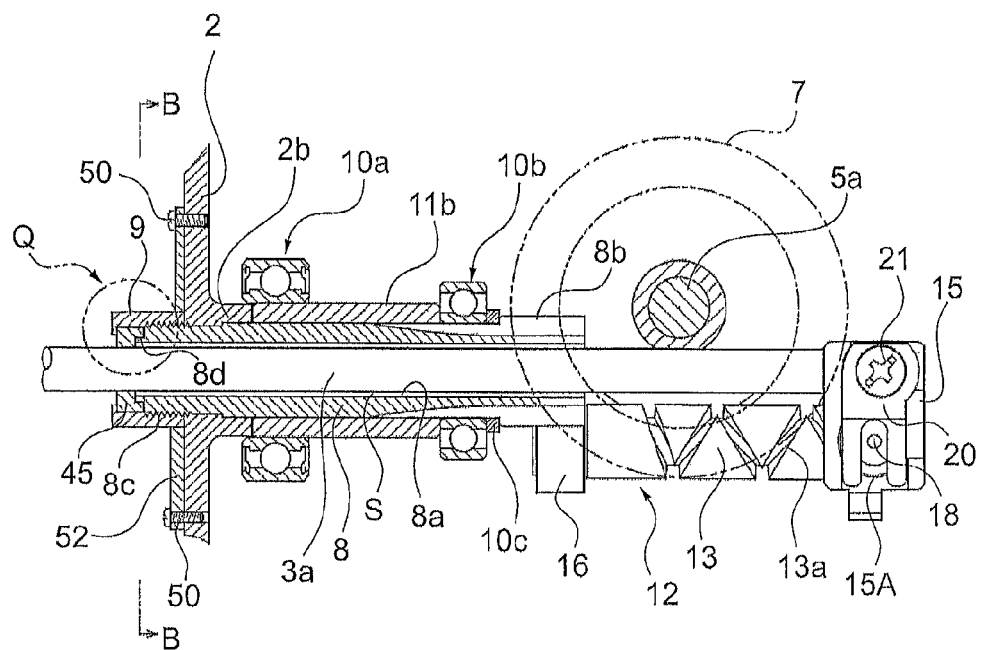
FIG. 7a is an enlarged view of a main part of the fishing spinning reel according to the fifth embodiment of the present invention, partially showing a section thereof.
Figure 7B:
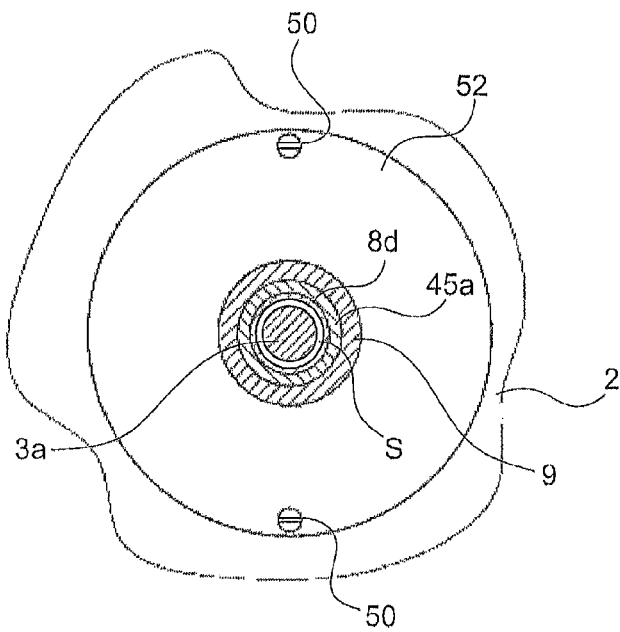
Figure 8:
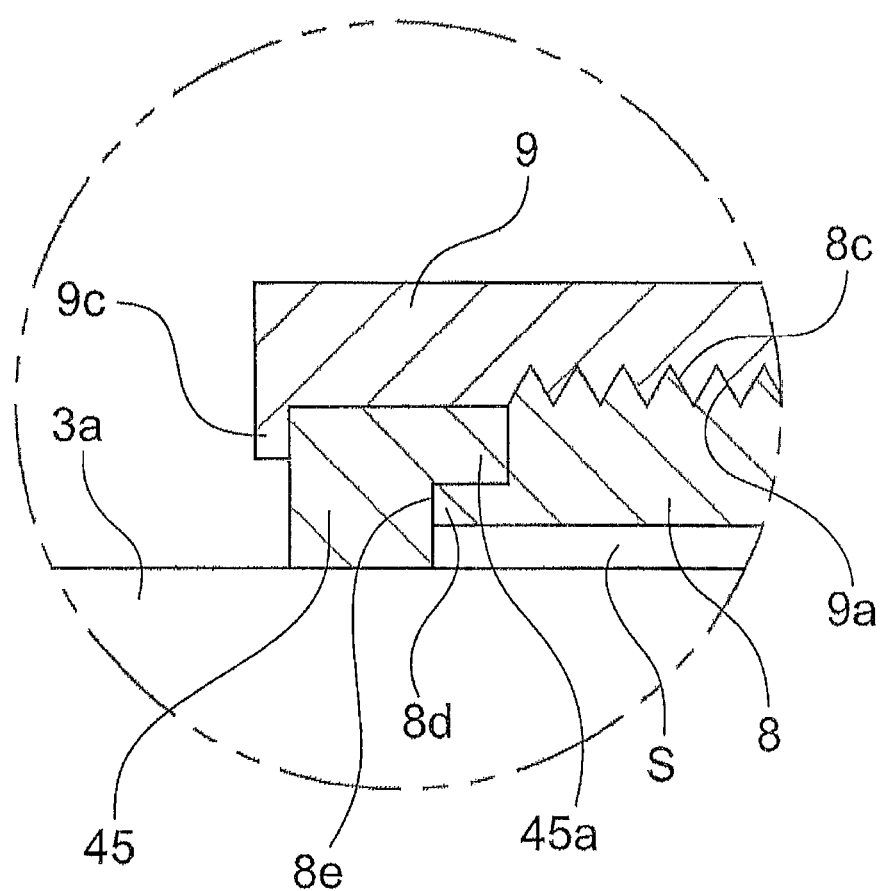

FIGS. 7*a*, 7*b*, and 8 show the fifth embodiment of the present invention. In this embodiment as shown, the support member interposed between the rotor nut 9 and the projection end of the spool shaft 3*a* projecting beyond the front end 8*e* of the pinion gear 8 may be formed of a slide bearing (e.g., a bush member or a collar member made of a synthetic resin) 45, not a rolling bearing. Further, in the embodiment, the rotor nut 9 may not be provided with the annular projection 9*b* or the collar member 42 unlike the fourth embodiment; the slide bearing 45 serving as a support member may be directly interposed between the inner circumferential surface of the rotor nut 9 and the outer circumferential surface of the spool shaft 3*a* projecting from the front end 8*e* of the pinion gear 8; and the concentric fitting portion 45*a* of the slide bearing 45 may project axially toward the pinion gear 8 side so as to completely fill the gap c of the fourth embodiment formed between the inner circumferential surface of the rotor nut 9 and the projecting fitting portion 8*d* of the pinion gear 8, the concentric fitting portion 45*a* concentrically fitting on the projecting fitting portion 8*d* of the pinion gear 8. The concentric fitting portion 45*a* may have a circular section, and an inner circumferential surface thereof may be concentrically fitted around the outer circumferential surface of the projecting fitting portion 8*d* of the pinion gear 8, which also has a circular section. The concentric fitting portion 45*a* may contact the end surface of the step 8*f* of the pinion gear 8. In other respects, this embodiment may be configured in the same way as the fourth embodiment. Accordingly, the above arrangement may produce the same effect as in the fourth embodiment and simplify the structure of the support member.

Figure 9A:
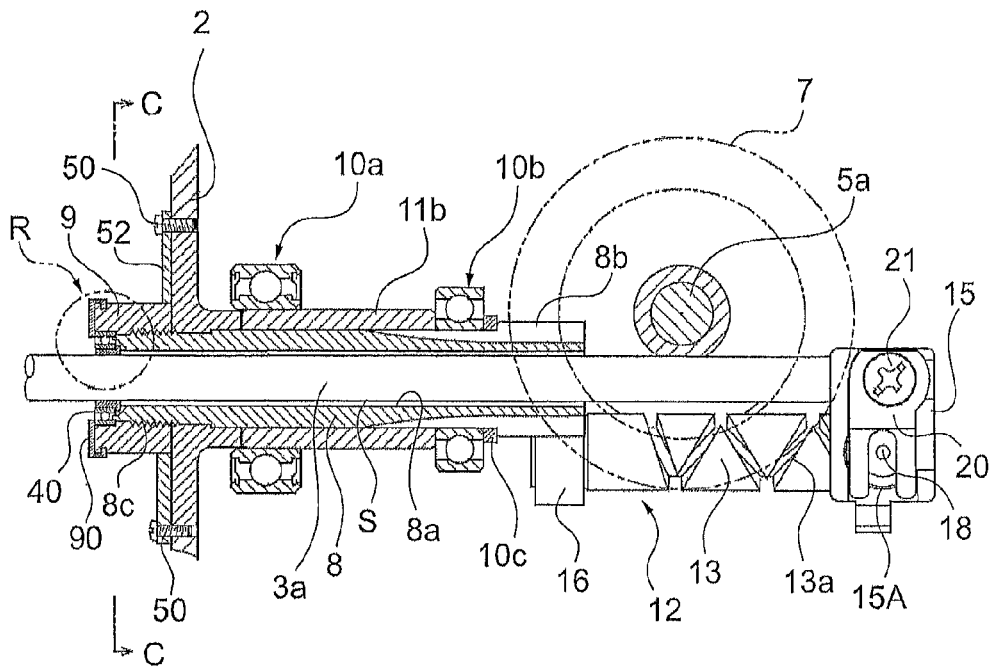
FIG. 9a is an enlarged view of a main part of the fishing spinning reel according to the sixth embodiment of the present invention, partially showing a section thereof.
Figure 9B:
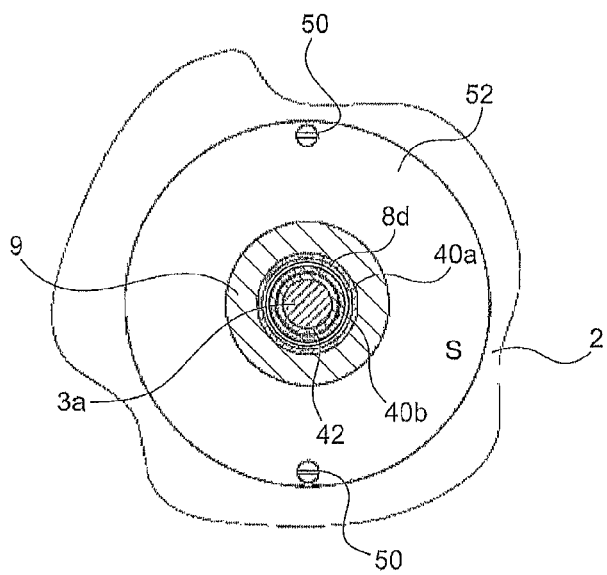
Figure 10:
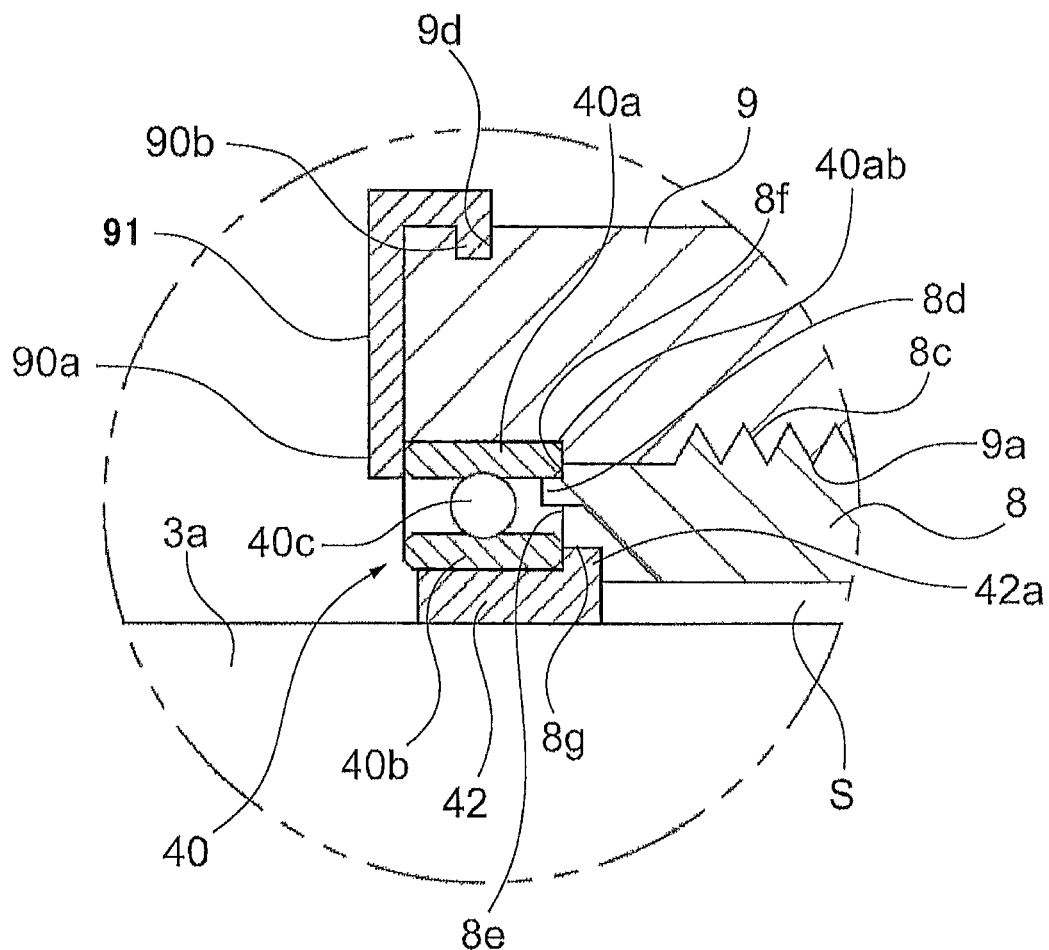

FIGS. 9*a*, 9*b*, and 10 show the sixth embodiment of the present invention. As shown, in this embodiment as an exemplary variation of the fourth embodiment, the outer race 40*a* of the rolling bearing 40 serving as a support member may not extend longer in the axial direction than the inner race 40*b* but may have the same axial length as the inner race 40*b*; and the end edge of the circular section of the outer race 40*a* serving as the concentric fitting portion 40*ab* may be concentrically fitted around the outer circumferential surface of the projecting fitting portion 8*d* of the pinion gear 8 having a circular section.

In the embodiment, the collar member 42 interposed between the inner circumferential surface of the support member 40 and the outer circumferential surface of the spool shaft 3*a* may include a fitting portion 42*a* concentrically fitted in the inner circumferential surface 8*g* of the front end of the pinion gear 8. As the concentric fitting portion 40*ab*, the concentric fitting portion 42*a* may also have a circular section; and an outer circumferential surface thereof may be concentrically fitted in the inner circumferential surface of a front end of the pinion gear 8, which also has a circular section.

Further, in the embodiment, the retainer for preventing the support member 40 from coming off of the pinion gear 8 in the axial direction may not be formed of the rotor nut 9 but formed of another member attached on the rotor nut 9. More specifically, in the embodiment, a retaining member 91 may be provided on and contacted with the front end surface of the rotor nut 9. The retaining member 91 may have a radially outer end thereof bent generally in an L-shape and may be mounted on the rotor nut 9 with the bending end 90*b* thereof locked in a locking groove 9*d* in the outer surface of the rotor nut 9. The radially inner end 90*a* of the retaining member 91 may contact with the front end edge of the outer race 40*a* of the rolling bearing 40 serving as a support member fitted on the projecting fitting portion 8*d* of the pinion gear 8, whereby the retaining member 91 may prevent the interposed support member 40 from coming off of the pinion gear 8 in the axial direction. As in the foregoing embodiment, the retaining contact portion 9*c* may be formed directly on the rotor nut 9.

With such an arrangement of the embodiment, the concentric fitting portion 40*ab* of the support member 40 and the fitting portion 42*a* of the collar member 42 may ensure the concentricity of the spool shaft 3*a* with respect to the pinion gear 8; therefore, the accuracy of the concentricity may be further increased.

Figure 11:
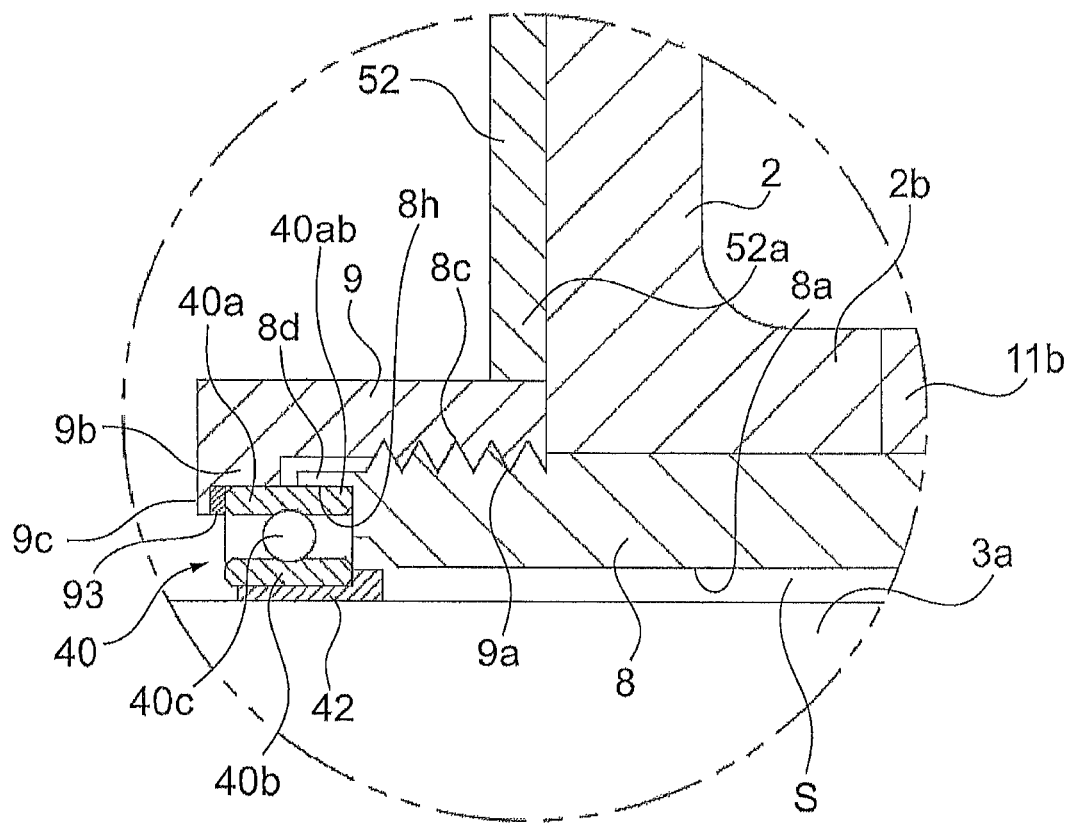
FIG. 11 is an enlarged view of a main part of the fishing spinning reel according to the seventh embodiment of the present invention.

FIG. 11 shows the seventh embodiment of the present invention. As shown, this embodiment is also an exemplary variation of the fourth embodiment. As in the sixth embodiment, the outer race 40*a* of the rolling bearing 40 serving as a support member may not extend longer in the axial direction than the inner race 40*b* but may have the same axial length as the inner race 40*b*; and the end edge of the circular section of the outer race 40*a* may serve as the concentric fitting portion 40*ab*. Further, in this embodiment, (the outer circumferential surface of) the end edge of the circular section of the outer race 40*a* serving as the concentric fitting portion 40*ab* may be concentrically fitted around the inner circumferential surface 8*h* of the projecting fitting portion 8*d* of the pinion gear 8 having a circular section. In other words, the rolling bearing 40 serving as a support member may be interposed between the inner circumferential surface of the rotor nut 9 and the outer circumferential surface of the spool shaft 3*a* projecting from the front end of the pinion gear 8, and also interposed between the pinion gear 8 and the spool shaft 3*a*. In other respects, this embodiment may be configured in the same way as the fourth embodiment. Accordingly, this embodiment may produce the same effect as the fourth embodiment.

Embodiments of the present invention are not limited to the above descriptions and are susceptible to various modifications. For example, in the above embodiment, the support member may serve as a rotation locking member for the rotor nut or may be the rotor nut; further, the support member may also be, for example, a dedicated member for supporting the spool shaft 3*a*, including the concentric fitting portion 60*a* fitted around the outer circumferential surface of the distal end fitting portion 8*d* of the pinion gear 8 having a circular section or the inner tube 60*a* concentric with the outer circumferential surface of the fitting portion 8*g* having a circular section, wherein the concentric fitting portion 60*a* and the inner tube 60*a* may not be related to the rotor nut. The supporting mode or form of the support member 60 is not limited.

The support member may be desirably arranged as long as it is interposed between the rotor nut and the spool shaft so as to form the gap s between the spool shaft and the pinion gear thereby to achieve concentricity with respect to the pinion gear. Additionally, the concentric fitting portion of the support member may have a desirably shaped fitting section as long as it is concentric with respect to the pinion gear. That is, the fitting between the concentric fitting portion of the support member and a corresponding fitting portion of the pinion gear may be achieved by either fitting between (perfectly) circular sections or fitting between substantially circular sections at least partially including a circular arc or other sections.

What is claimed is:

1. A fishing spinning reel comprising:
    a reel body;
    a handle adapted to be rotatably supported on the reel body;
    a drive gear adapted to be rotationally driven by rotational operation of the handle;
    a pinion gear adapted to mesh with the drive gear;
    a rotor adapted to be fixed on a distal end of the pinion gear;
    a spool shaft adapted to be inserted through the pinion gear so as to maintain a gap between the spool shaft and an inner circumferential surface of the pinion gear;
    a spool mounted on a front end of the spool shaft, wherein the spool is adapted to hold a fishing line wound therearound;
    an oscillation device adapted to support a rear end of the spool shaft, wherein the oscillation device is adapted to reciprocate the spool shaft back and forth in accordance with drive of the drive gear, and a support member adapted to support the front end of the spool shaft and having a concentric fitting portion for achieving concentricity with respect to the pinion gear, wherein the spool shaft is supported at only two points, one at the support member positioned in front of a front end of the pinion gear, and the other at a slide member of the oscillation device, whereby an outer circumferential surface of the spool shaft does not contact the inner circumferential surface of the pinion gear and the gap is maintained.

2. The fishing spinning reel of claim 1 wherein the concentric fitting portion of the support member is concentrically fitted on the pinion gear.

3. The fishing spinning reel of claim 1 wherein the rotor is concentrically fitted on the pinion gear, and the concentric fitting portion of the support member is concentrically fitted on the rotor.

4. The fishing spinning reel of claim 1 wherein the rotor is fixed with a rotor nut screwed on the front end of the pinion gear, and the support member serves as a rotation locking member for the rotor nut.

5. The fishing spinning reel of claim 1 wherein the rotor is fixed with a rotor nut screwed on the front end of the pinion gear, and the support member is interposed between the rotor nut and the spool shaft.

6. The fishing spinning reel of claim 5 wherein the support member is a rolling bearing, and the concentric fitting portion is formed of an outer race of the rolling bearing.

7. The fishing spinning reel of claim 5 further comprising a collar member interposed between an inner circumferential surface of the support member and the outer circumferential surface of the spool shaft.

8. The fishing spinning reel of claim 5 further comprising a retainer for preventing the support member from coming off of the pinion gear in an axial direction.

9. The fishing spinning reel of claim 8 wherein the retainer is formed of the rotor nut.

* * * * *